United States Patent [19]

Cipris

[11] 4,115,238

[45] Sep. 19, 1978

[54] SELENIUM- AND TELLURIUM-COATED METAL ELECTRODES

[75] Inventor: Divna Cipris, Morristown, N.J.

[73] Assignee: Allied Chemical Corporation, Morris Township, Morris County, N.J.

[21] Appl. No.: 786,703

[22] Filed: Apr. 11, 1977

[51] Int. Cl.² .................................. C25B 11/04
[52] U.S. Cl. .................. 204/290 R; 204/291; 204/129
[58] Field of Search .................. 204/290 R, 290 F

[56] References Cited
U.S. PATENT DOCUMENTS 3,419,900  12/1968  Elmore et al. .................. 429/16
3,663,414  5/1972  Martinsons et al. .............. 204/290 F
3,839,181  10/1974  Degueldre et al. .............. 204/290 F
3,929,608  12/1975  Degueldre et al. .............. 204/290 F
3,956,083  5/1976  Cook .................................. 204/95

Primary Examiner—F.C. Edmundson
Attorney, Agent, or Firm—Gerhard H. Fuchs; Robert A. Harman

[57] ABSTRACT

Electrodes of a metal selected from the group consisting of iron, cobalt, nickel, manganese, chromium and alloys thereof having a conductive coating of selenium and/or tellurium, in oxidized form, are suitable for use as oxygen electrodes and have enhanced catalytic activity for oxygen evolution in neutral, acidic and alkaline media.

8 Claims, 6 Drawing Figures

SELENIUM- AND TELLURIUM-COATED METAL ELECTRODES

CROSS-REFERENCE TO RELATED APPLICATION

U.S. application Ser. No. 786,704 by Cipris and Pouli for "Selenium-Containing Coating for Metal Electrodes", filed of even date herewith, discloses conductive coatings for metal electrodes comprising one or more metals of the platinum group, in metallic or oxidized form, together with selenium in oxidized form, as well as metal electrodes covered with such coatings, as having enhanced catalytic activity for oxygen evolution in both acidic and alkaline media.

BACKGROUND OF THE INVENTION

Metal electrodes composed of a valve metal base, such as titanium, tantalum, zirconium, molybdenum, columbium and tungsten, having coatings of mixed metal oxides, especially of metals of the platinum group, have been known for some time (see, e.g., South African Pat. No. 68/7482). Such electrodes, being resistant to attack under electrolysis conditions, are dimensionally stable and permit construction of electrolytic cells having higher capacity and reduced electrical energy requirements. For these reasons, they have found wide use in the production of alkali metal hydroxide and chloride by electrolysis of salt brine. Numerous variations and modifications of dimensionally stable metal electrodes based on such valve metals have been patented or described in the literature. For example, German Offenlegungschrift No. 2,045,348 describes titanium-based metal electrodes having an active coating of a solid solution of titanium dioxide and at least one dioxide of chromium, manganese and/or rhenium. Metal electrodes containing a tellurium-doped conductive coating based on cobalt, chromium, iron, manganese, aluminum, gallium, iridium, rhenium or vanadium, or based on one or more elements of the platinum group, are respectively described in German Offenlegungschrift Nos. 2,136,391 and 2,136,394.

Numerous electrodes for electrochemical reduction of oxygen have been investigated and reported as suitable for use in fuel cells and air batteries. These include $MnO_2$-coated electrodes, electrodes having a surface of lithiated nickel oxide, or of mixed oxide films of nickel/praseodymium oxides and nickel/cobalt oxides.

There is always need for new types of metal electrodes for use in electrochemical processes.

SUMMARY OF THE INVENTION

The present invention provides metal electrodes for use in electrochemical processes comprising a metallic base comprising a metal selected from the group consisting of iron, cobalt, nickel, manganese, chromium and alloys thereof with each other, having deposited thereon a surface coating of selenium, tellurium, or mixtures thereof, each in oxidized form.

The electrodes of the present invention have pronounced catalytic activity for electrolytic oxygen generation in neutral, acidic as well as alkaline media, and for catalytic oxygen reduction in alkaline media. The latter property permits their use in fuel cells and air batteries.

My discovery of the catalytic acitivity of selenium and tellurium coatings, in oxidized form, on electrodes of iron, cobalt, nickel, manganese, chromium and alloys thereof for electrolytic oxygen generation was surprising since electrodes of the above-described valve metals carrying such coatings, particularly titanium electrodes carrying such coatings, do not seem to have such catalytic activity, at least under the conditions investigated. On titanium electrodes, coatings of selenium and tellurium oxides impart such catalytic activity only when doped with certain noble metal oxides.

BRIEF DESCRIPTION OF THE DRAWINGS

Performance characteristics of representative metal electrodes of the present invention are illustrated in the annexed drawings, wherein.

Figure 1:
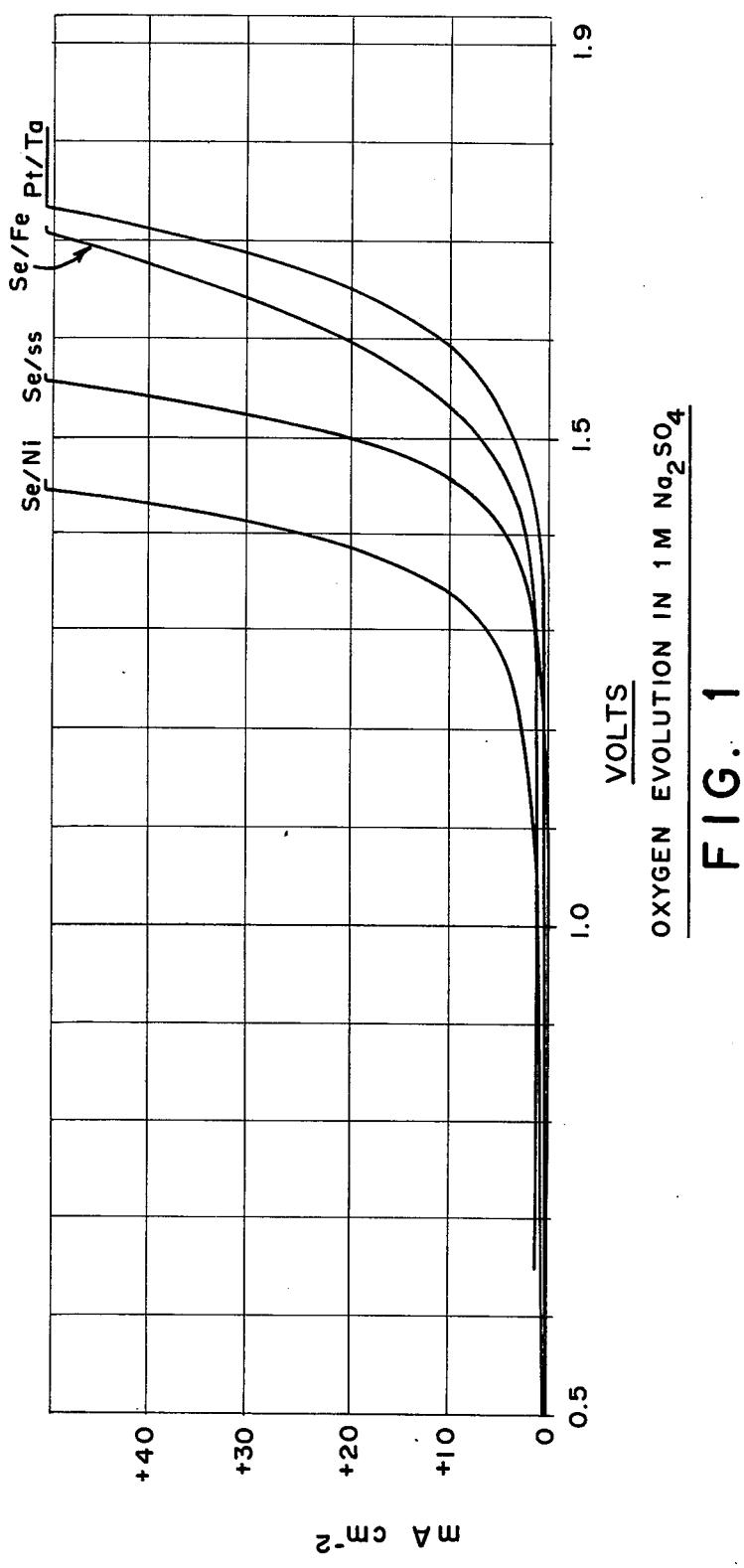
FIG. 1 presents linear polarization plots relating to oxygen evolution by electrolysis of 1 M $Na_2SO_4$ using a platinum/tantalum anode as well as nickel, stainless steel and iron anodes, each coated with selenium oxide.

DETAILED DESCRIPTION OF THE INVENTION, OF THE PREFERRED EMBODIMENTS, AND OF THE BEST MODE PRESENTLY CONTEMPLATED FOR ITS PRACTICE

The electrodes of the present invention for use in electrochemical processes are composed of a metallic base comprising a metal selected from the group consisting of iron, cobalt, nickel, manganese, chromium and alloys thereof with each other. The metallic base may, of course, also be composed of alloys of metals within this group with other metals, so as long as the resultant alloys, for purposes of performance in the electrodes, still possess the essential characteristics imparted by iron, cobalt, nickel, manganese and chromium. Such alloys will generally contain at least about 50 atomic percent of one or more of iron, cobalt, nickel, manganese and chromium. Desirably, electrodes of the present invention have a metallic base of nickel or stainless steel, preferably of nickel.

The conductive coating of selenium and/or tellurium, each in oxidized form, may be applied to the base metal in known manner, as by dipping the formed base metal electrode into a solution or suspension of a selenium and/or tellurium compound in soluble or dispersible form, say in the form of a water-soluble salt, or in the form of selenous or tellurous acid or selenic and telluric acid, in the desired proportions, followed by evaporation of the solvent or dispersant, and finally by a thermal treatment, desirably in an oxidizing atmosphere, preferably in air, at temperatures in the order of about 300° to about 600° C. Desirably, several cumulative layers of the coating are applied consecutively to obtain a coating of desired thickness.

The following Examples further illustrate the present invention and set forth the best mode presently contemplated for its practice.

EXAMPLE 1

Selenium oxide-coated nickel electrodes were prepared as follows:

A 30 milligram portion of selenous acid ($H_2SeO_3$) was dissolved in 2 ml. of dimethyl formamide. This solution was brushed onto a thoroughly cleaned nickel screen electrode, followed by drying of the electrode in a furnace at 350° C for 10 minutes. Brushing and drying was repeated eight to ten times. After final treatment, the electrode was heated in air in a furnace for 1 to 2 hours at 350° to 450° C. An adhering coating was thus deposited on the nickel electrode. Prior to coating, the nickel screen electrode had been cleaned by rinsing it in acetone, boiling it in 1:2 conc. $HCl/H_2O$ for a few minutes, followed by rinsing in water, then acetone and drying in air.

EXAMPLE 2

The procedure of Example 1 was repeated, employing as base electrode an iron screen electrode.

EXAMPLE 3

The procedure of Example 1 was repeated, employing as base electrode a stainless steel (SS 316) screen electrode.

EXAMPLE 4

The procedure of Example 1 was repeated, employing for the coating operation a solution of 60 milligrams selenous acid ($H_2SeO_3$) in 2 ml. dimethyl formamide.

EXAMPLE 5

The procedure of Example 1 was repeated, substituting 62 milligrams of $TeCl_4$ for the 30 milligrams of selenous acid to obtain a tellurium oxide-coated nickel electrode.

Metal electrodes in accordance with the present invention carrying a conductive coating of selenium, tellurium or mixtures thereof, in oxidized form, are particularly suited for electrolytic processes involving oxygen evolution in neutral, alkaline as well as acidic media; for use in processes involving electrolytic oxidation of organic compounds; for electrolytic reduction of oxygen in alkaline media; as well as for electrolytic reactions in general.

Performance of representative electrodes of the present invention is demonstrated in the below described electrolysis tests wherein current-voltage curves (linear polarization plots) were obtained employing as anodes metal electrodes of the present invention as well as metal electrodes of the prior art. In these tests a three-compartment cell was employed, of conventional design, having anolyte and catholyte compartments separated by a fritted glass disc to prevent gross electrolyte transfer. A calomel reference electrode was used to monitor electrode potentials of the working electrode (anode). The anode had a geometric area of 1 square centimeter. The cathode consisted of platinized tantalum. A stream of argon was bubbled through the electrolyte to purge oxygen from the electrolyte in experiments involving oxygen evolution; a stream of pure oxygen was employed in experiments involving oxygen reduction. Voltage was applied at a scan rate of 10 millivolts per second. Current-voltage curves were automatically plotted. All tests were conducted at room temperature (about 22° C). The results of these tests are shown in the drawings.

OXYGEN EVOLUTION IN A NEUTRAL MEDIUM

FIG. 1 shows current voltage curves obtained in 1M $Na_2SO_4$ using (1) a selenium oxide-coated nickel electrode of the present invention prepared as described in Example 1, above; (2) a selenium oxide-coated stainless steel electrode of the present invention, prepared as described in Example 3, above; and (3) a selenium oxide-coated iron electrode, prepared as described in Example 2, above; in comparison with a conventional platinum/tantalum-coated titanium electrode. As FIG. 1 demonstrates, oxygen evolution on the electrodes in accordance with the present invention occurs at significantly lower voltage than on the platinum/tantalum-coated electrode of the prior art.

OXYGEN EVOLUTION IN ACIDIC MEDIA

Figure 2:
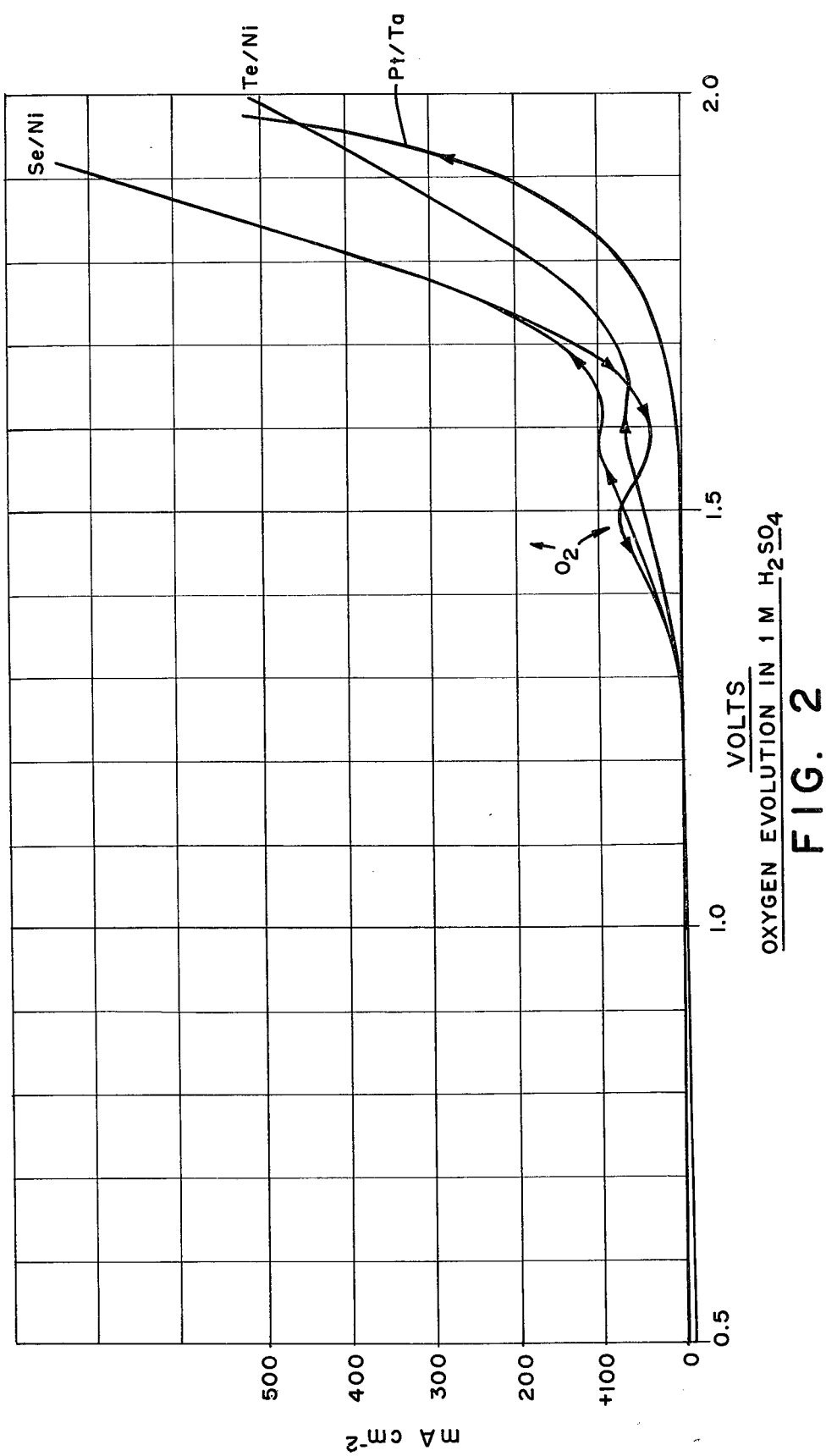
FIGS. 2 and 3 present linear polarization plots relating to oxygen evolution in 1 M $H_2SO_4$ employing selenium oxide- and tellurium oxide-coated nickel electrodes of the present invention in comparison with nickel and platinum/tantalum-coated electrodes of the prior art.

FIG. 2 shows current-voltage curves obtained in 1 M $H_2SO_4$ using (1) a selenium oxide-coated nickel electrode prepared as per Example 4, above; (2) a tellurium oxide-coated nickel electrode prepared as per Example 5, above; and (3) a conventional platinum/tantalum-coated electrode. The voltage at which oxygen evolution on the selenium oxide- and tellurium oxide-coated electrodes commences (which is well below the voltage at which oxygen evolution on the platinum/tantalum-coated electrode commences), is indicated by the notation "$O_2$".

Figure 3:
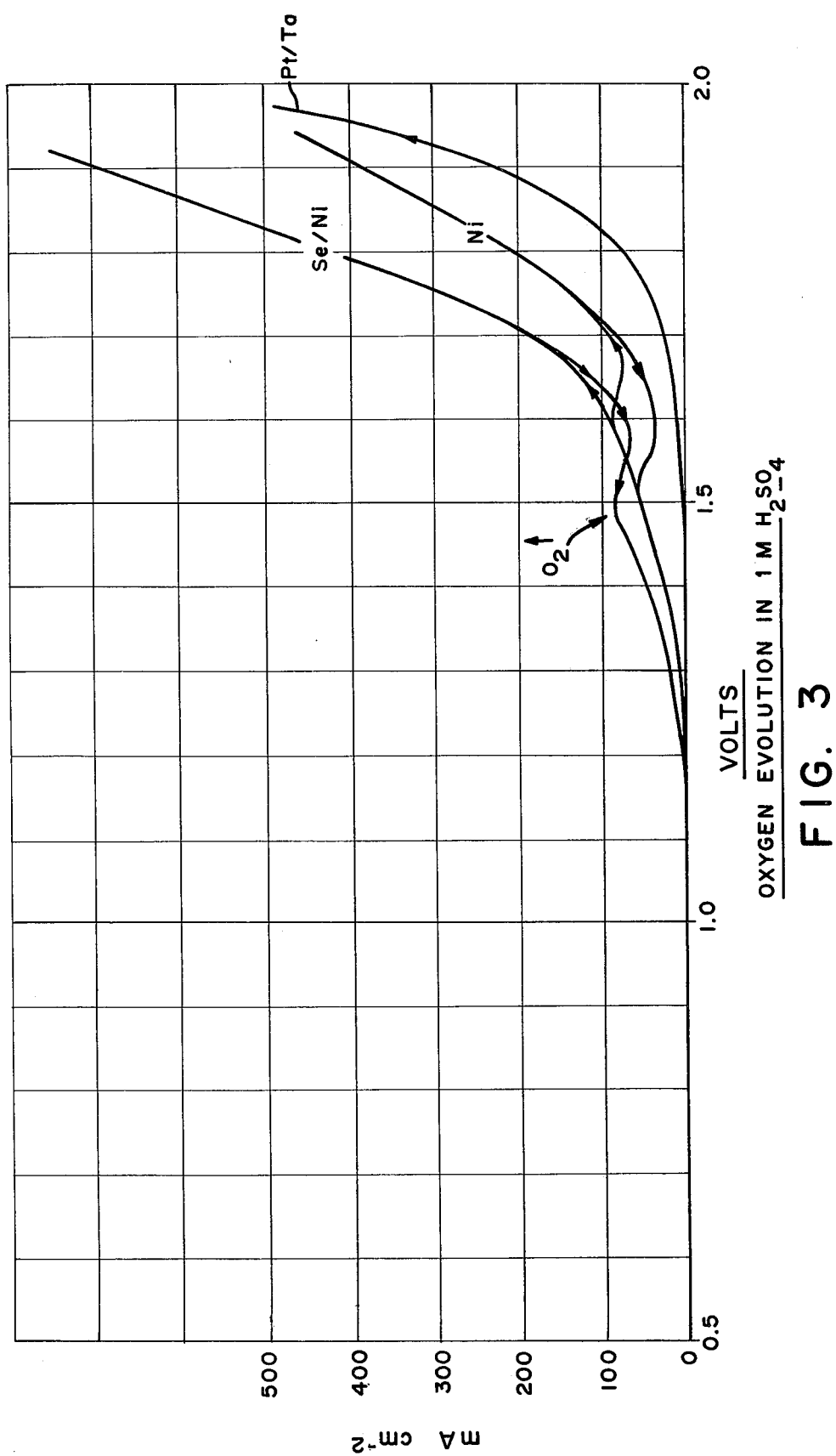

FIG. 3 shows current-voltage curves obtained in 1 M $H_2SO_4$ using (1) a selenium oxide-coated nickel electrode prepared as per Example 4, above; a nickel electrode of the prior art; and (3) a platinum/tantalum-coated electrode of the prior art. The voltage at which oxygen evolution commences on the selenium oxide-coated electrode and the nickel electrode is indicated by the notation "$O_2$",

OXYGEN EVOLUTION IN AN ALKALINE MEDIUM

Figure 4:
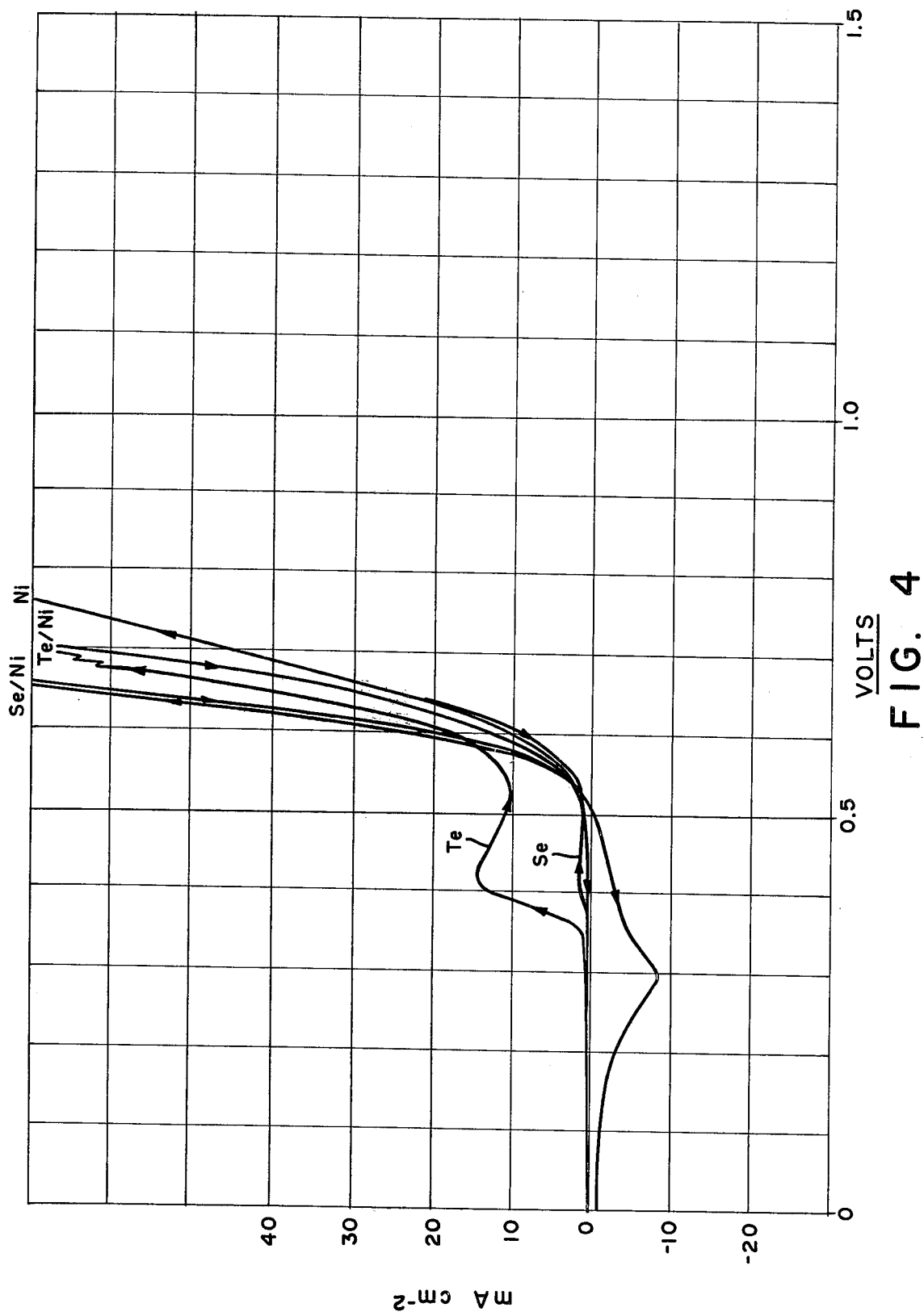
FIG. 4 presents linear polarization plots relating to oxygen evolution by electrolysis of 0.1 N NaOH using a nickel electrode as well as selenium oxide- and tellurium oxide-coated nickel electrodes.

FIG. 4 shows current-voltage curves obtained by electrolysis of 0.1 N NaOH employing (1) a selenium oxide-coated nickel electrode of the present invention prepared as per Example 1, above; (2) a tellurium oxide-coated nickel electrode prepared as described above in Example 5; and (3) a nickel electrode of the prior art.

OXYGEN REDUCTION IN AN ALKALINE MEDIUM

Figure 5:
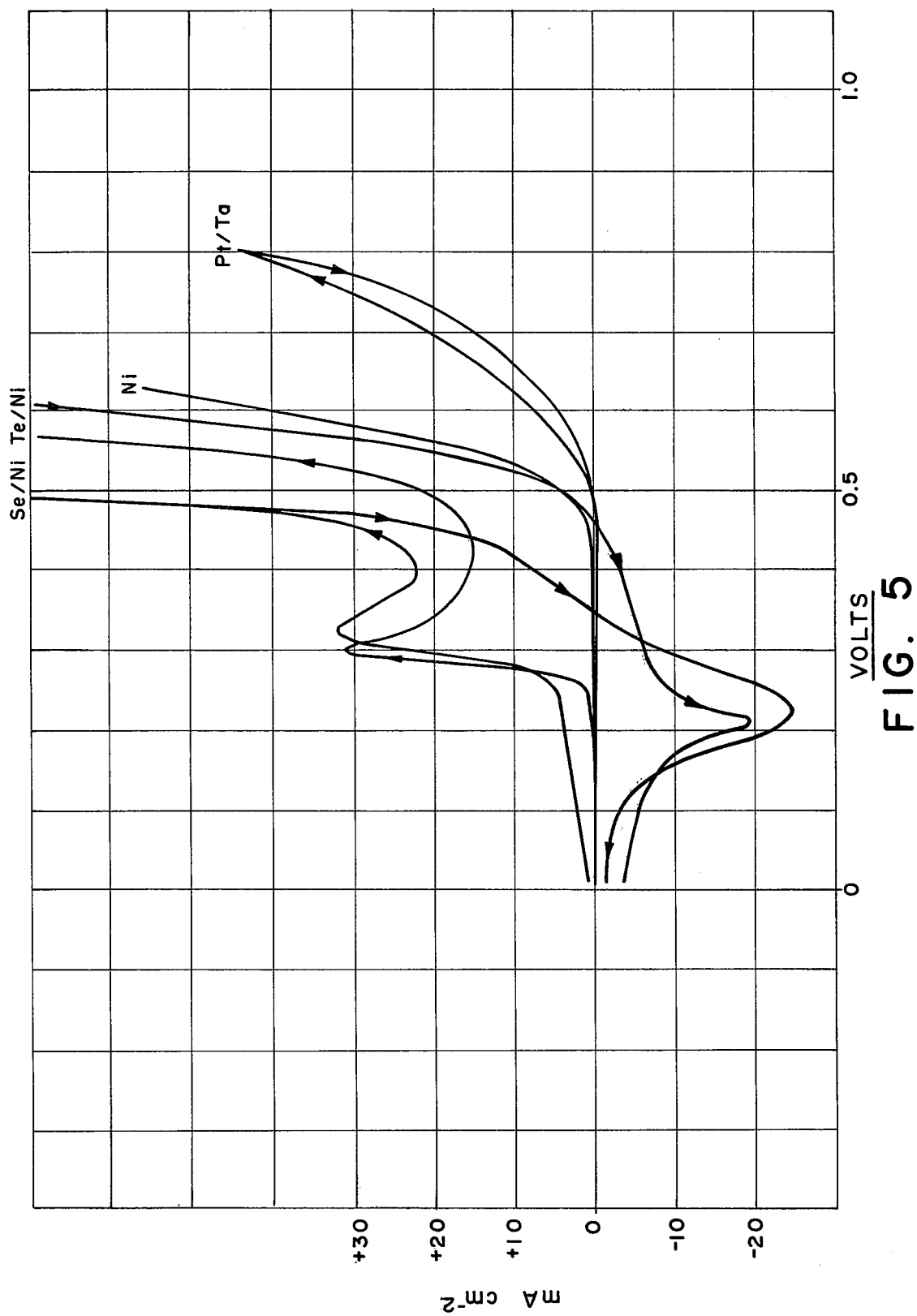
FIG. 5 presents linear polarization plots showing electrolytic oxidation and reduction of oxygen in 1 N NaOH using a platinum/tantalum electrode, a nickel electrode, as well as selenium oxide- and tellurium oxide-coated nickel electrodes.

FIG. 5 shows current-voltage curves obtained by electrolysis of 1 N NaOH under oxygen sweep employing (1) a selenium oxide-coated nickel electrode of the present invention prepared as per Example 1, above; (2) a tellurium oxide-coated nickel electrode prepared as per Example 5, above; (3) a nickel electrode of the prior art; and (4) a platinum/tantalum-coated titanium electrode of the prior art. Here it should be noted that the negative current flow of the cathodic sweep (back-sweep from higher to lower voltage) which is observed only for the selenium oxide- and tellurium oxide-coated nickel electrodes of the present invention, and not for the conventional nickel and platinum/tantalum titanium electrodes of the prior art, is believed to be indicative of reduction of elemental oxygen or chemisorbed oxygen.

Figure 6:
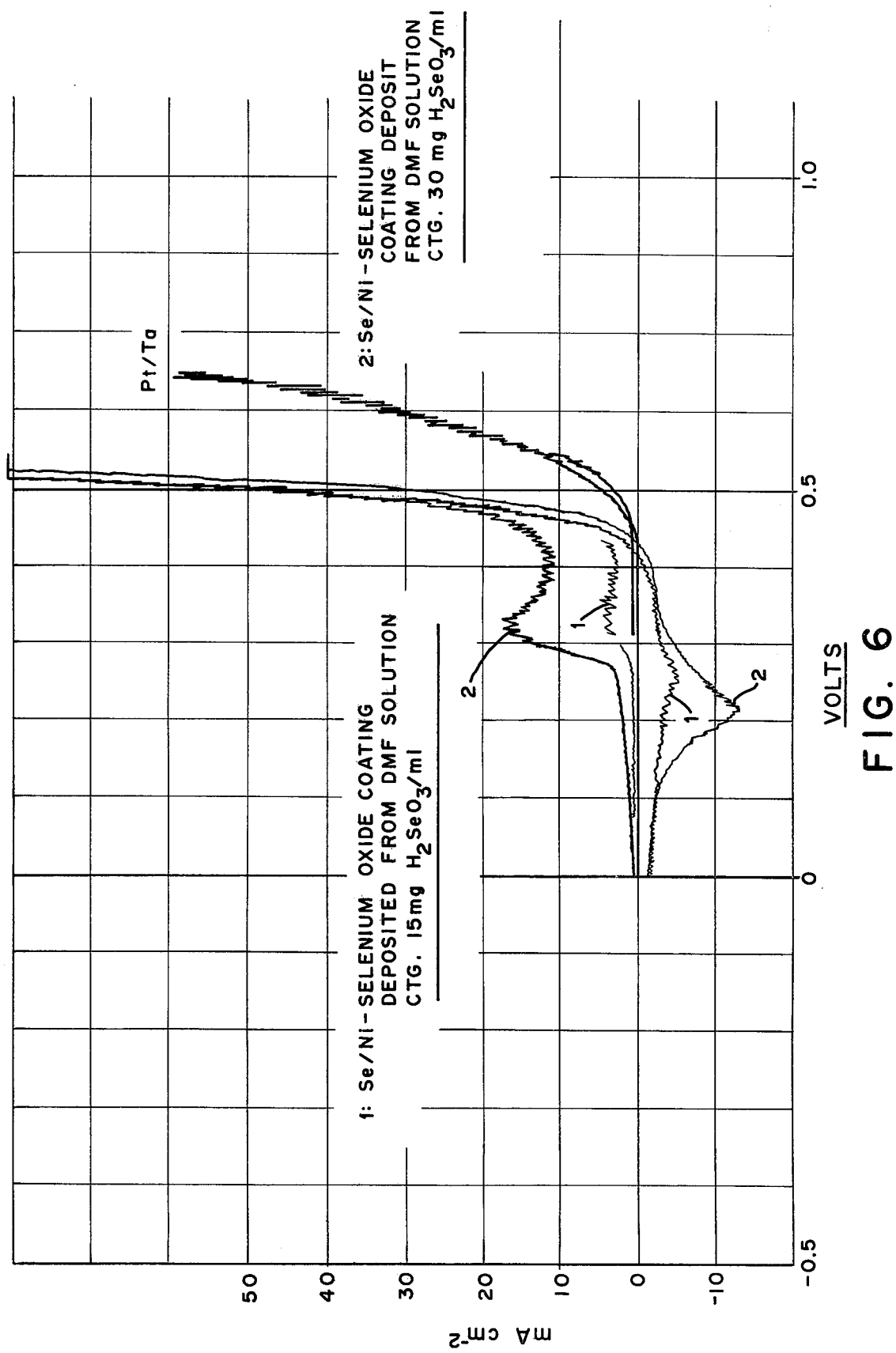
FIG. 6 presents linear polarization plots obtained on electrolysis of 1 N NaOH in the presence of oxygen using a platinum/tantalum electrode and selenium oxide-coated nickel electrodes having selenium oxide coatings of different thicknesses.

FIG. 6 shows further comparative current-voltage curves for electrolysis conducted under oxygen purge in 1 N NaOH employing selenium oxide-coated nickel electrodes in accordance with the present invention, as compared to a platinum/tantalum-coated titanium electrode of the prior art. The selenium oxide-coated nickel electrodes employed therein differ from each other in that one electrode had been coated using a solution of 30 milligrams of selenous acid in 2 ml. of dimethyl formamide in accordance with Example 1, and the other had been coated with a solution of 60 milligrams of selenous acid in 2 ml. of dimethyl formamide, but otherwise following the procedure of Example 1. These curves indicate that the heavier selenium oxide coatings as obtained from more concentrated selenous acid solution have a tendency to be more effective in oxygen oxidation/reduction electrolysis in alkaline media.

When other metal electrodes carrying a selenium oxide and/or tellurium oxide coating in accordance with the present invention are substituted for the selenium and tellurium oxide coated nickel, stainless steel and iron electrodes in the above-described procedures, similar results are obtained, that is to say, electrolytic production of oxygen in neutral, alkaline as well as acidic media, and electrolytic reduction of oxygen, in alkaline media, proceed in similar manner to that shown herein.

Since various changes may be made in carrying out my invention without departing from its scope and essential characteristics, all matter contained in the above description shall be interpreted as illustrative only, the scope of my invention being defined by the appended claims.

I claim:

1. An electrode for use in electrochemical processes comprising a metallic base comprising a metal selected from the group consisting of iron, cobalt, nickel, manganese, chromium and alloys thereof with each other, having deposited thereon and in direct contact therewith a surface coating of selenium, tellurium or mixtures thereof, each in oxidized form.

2. An electrode according to claim 1 wherein the metallic base is comprised of nickel.

3. An electrode according to claim 1 wherein the metallic base is comprised of stainless steel.

4. An electrode according to claim 1 wherein the surface coating is comprised of selenium in oxidized form.

5. An electrode according to claim 4 wherein the metallic base is comprised of nickel.

6. An electrode according to claim 4 wherein the metallic base is comprised of stainless steel.

7. An electrode according to claim 1 wherein the surface coating is comprised of tellurium in oxidized form.

8. An electrode according to claim 7 wherein the metallic base is comprised of nickel.

* * * * *